United States Patent [19]
Caprio

[11] 3,898,571
[45] Aug. 5, 1975

[54] PULSE SHAPE DETECTOR
[75] Inventor: Samuel J. Caprio, Severna Park, Md.
[73] Assignee: The United States of America as represented by the Secretary of the Air Force, Washington, D.C.
[22] Filed: May 13, 1974
[21] Appl. No.: 469,196

[52] U.S. Cl. ............... 328/145; 325/324; 328/151; 328/163; 328/164
[51] Int. Cl. ........................ H03k 5/01; H04b 1/10
[58] Field of Search ............ 328/145, 151, 162–164; 307/260, 268; 325/323, 324

[56] References Cited
UNITED STATES PATENTS
3,662,274   5/1972   Pritchard et al. ............... 328/145 X
3,769,611  10/1973   Scaggs ............................ 328/145 X Primary Examiner—Siegfried H. Grimm
Attorney, Agent, or Firm—Joseph E. Rusz; William Stepanishen

[57] ABSTRACT

A pulse shape detector apparatus to process the distorted pulse output of logarithmic amplifiers in heterodyne receivers and to synthesize a replica of the input pulse to the amplifier.

8 Claims, 10 Drawing Figures

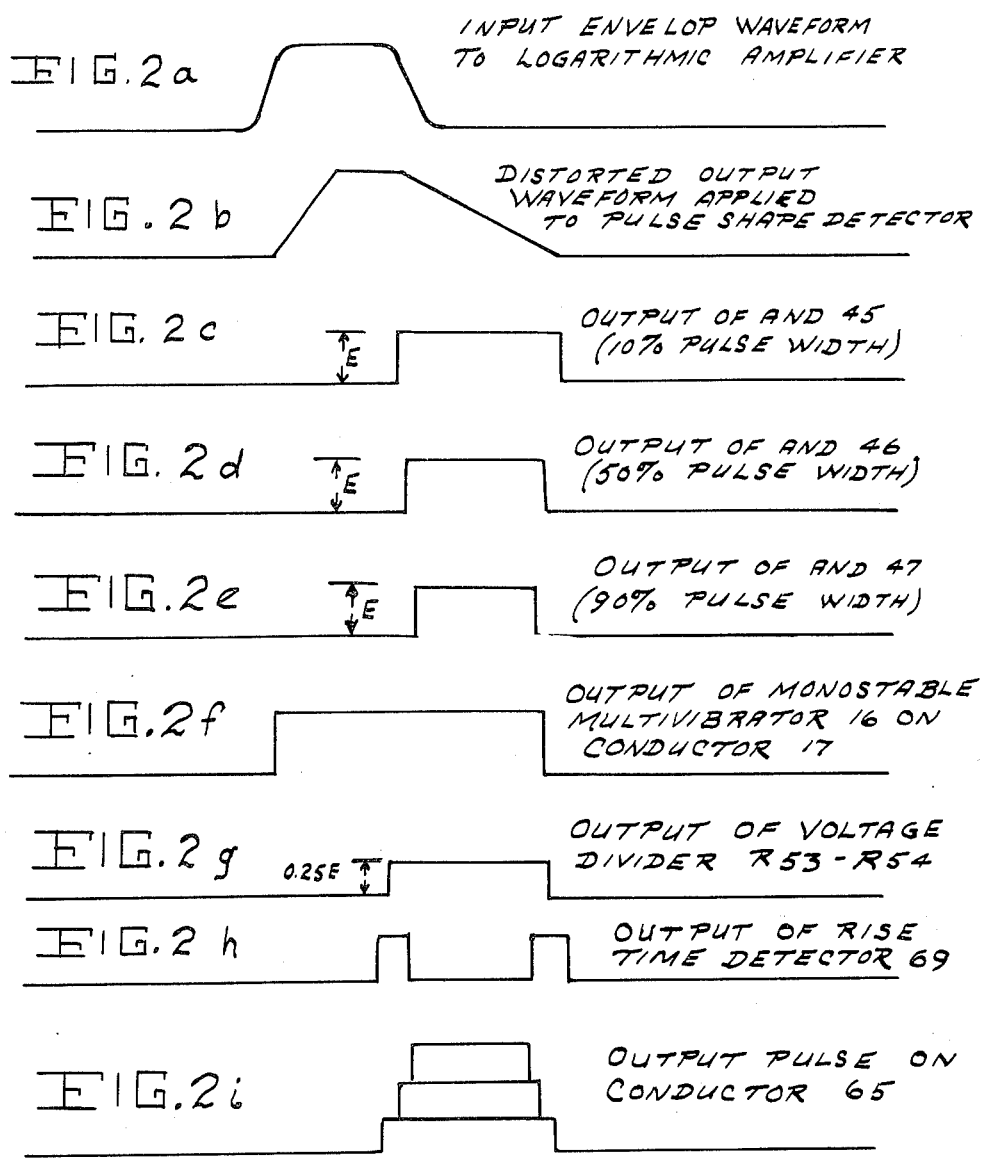

PULSE SHAPE DETECTOR

BACKGROUND OF THE INVENTION

The present invention broadly broadl to logarithmic amplifiers and in particular to a pulse shape detector apparatus to measure the characteristics of R.F. pulse signals from R.F. receiver logarithmic amplifiers.

In the prior art, the need for the logarithmic amplifier amplitude characteristic is particularly desirable when clutter interferes with the discernment of echo pulses. Clutter may be considered to comprise an erratic variation wave not unlike fluctuation noise superposed on a pulse that begins at high amplitude and decreases in amplitude with increase of range. The fluctuating component obseures the signal in the same way as would a noise wave of great amplitude and thus limits the receiver amplification that may usefully be employed. The clutter fluctuation is roughly proportional to the total clutter amplitude, and therefore for constant fluctuation amplitude at the receiver output, the amplification should be inversely proportional to the clutter amplitude. Exactly this relation is provided by logarithmic output-input curve. The random variations of fluctuation noise and clutter fluctuations are especially undesirable because of the extreme difficulty of detecting signal in the presence of such waveforms.

The present heterodyne receivers which are used to gather electronic intelligence or to measure electromagnetic interference due to R.F. pulse signals utilize logarithmic amplifiers which are used to measure the characteristics of radio frequency (R.F.) pulse signals. However, the desired signals may vary as much as 80 dB in amplitude from pulse to pulse and by utilizing a logarithmic amplifier the output amplitude is compressed to 20 dB. Since the logarithmic compression is nonlinear the output waveforms of the logarithmic amplifier are distorted replicas of the input waveform. The degree of waveform distortion is a function of the input signal level. The present invention provides the means to process the distorted output pulse from the logarithmic amplifiers and synthesizes a replica of the input pulse to the logarithmic amplifier.

SUMMARY

The present invention processes the distorted pulse output of logarithmic amplifiers in heterodyne receivers and synthesize a replica of the input pulse to the logarithmic amplifier. The pulse shape detector apparatus permits the synthesized pulse to be visually displayed on a cathode ray tube, or to be further processed for recording on magnetic tape for future analysis. The pulse shape detector apparatus also provides a rectangular pulse output whose width is equal to the rise time of the input pulse to the logarithmic amplifier. The rise time of a pulse is defined as the time required for the pulse to rise from the 10 percent amplitude level to the 90 percent amplitude level. An additional rectangular pulse output is provided by the pulse shape detector apparatus with a pulse width equal to the fall time of the input pulse to the logarithmic amplifier. The fall time is defined as the time required for the pulse to decrease in amplitude from the 90 percent amplitude to the 10 percent amplitude level.

It is one object of the invention, therefore, to provide an improved pulse shape detector apparatus to process the distorted output pulse of a logarithmic amplifier and synthesize a replica of the input pulse to the logarithmic amplifier.

It is another object of the invention to provide an improved pulse shape detector apparatus which provides a rectangular output pulse whose width is equal to the rise time of the input pulse to the logarithmic amplifier.

It is another object of the invention to provide an improved pulse shape detector apparatus which provides a rectangular output pulse whose width is equal to the rise time of the input pulse to the logarithmic amplifier.

These and other advantages, objects and features of the invention will become more apparent from the following description taken in connection with the illustrative embodiment in the accompanying drawings.

BRIEF DESCRIPTION OF THE DRAWINGS

FIGS. 2a–i are graphical representations of the waveforms which are utilized within the pulse shape detector apparatus.

DESCRIPTION OF THE PREFERRED EMBODIMENT

Figure 1:
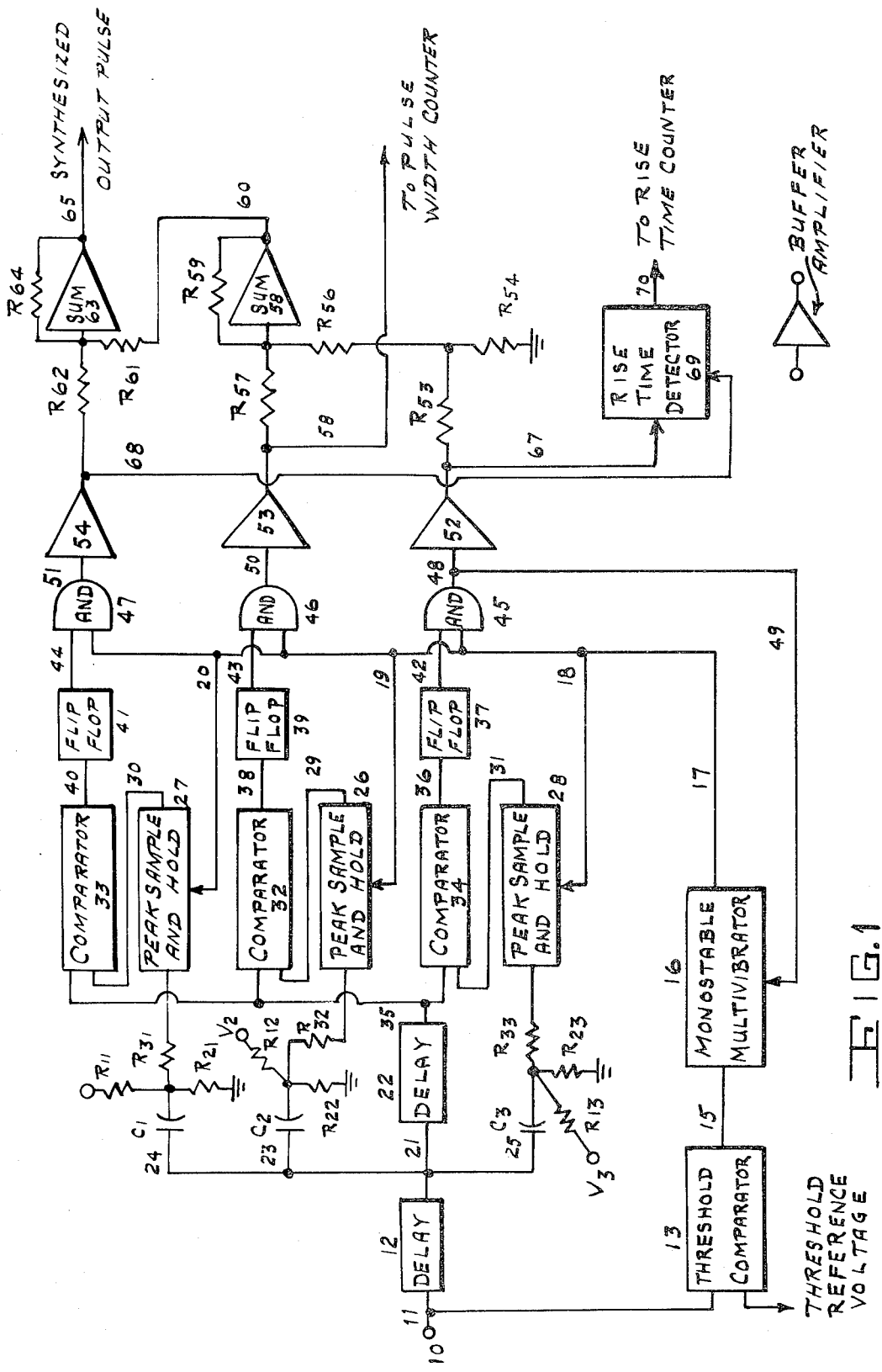
FIG. 1 is a block diagram of the pulse shape detector apparatus in accordance with this invention.

The present invention utilizes the following characteristic of the ideal logarithmic amplifier. The output voltage of an ideal logarithmic amplifier is given below.

$$E_o = K\log_{10} E_i$$

where $E_i$ is the input voltage with reference to some convenient level, $\log_{10}$ is the logarithmic function to the base 10 and K is a constant of proportionality. If the output voltage $E_{oo}$ corresponds to the peak value of the input pulse $E_p$, then the output voltage at any level of the input pulse is given by $$E_b = K\log_{10} bE_p$$

where b is the ratio of the desired amplitude level of the pulse to the peak level. The difference between the output voltage of the logarithmic amplifier which corresponds to the peak value of the input and the output voltage which corresponds to a predetermined percentage of the peak value of the input pulse is given by $$E_{oo} - E_b = -K\log b$$

which is independent of the peak value of the input pulse.

The time difference between the leading edge and trailing edge of the input waveform at a predetermined percentage level b of the peak voltage of the pulse is equal to the time difference between the leading and trailing edge of the output waveform of the logarithmic amplifier which is $E_b$ volts below the peak of the output pulse $E_{oo}$.

Turning now to FIG. 1, there is shown the block diagram of the pulse shape detector circuit incorporating the principles of the present invention. There is shown in FIG. 2a the envelope of the input pulse which is applied to the logarithmic amplifier (not shown). With reference to FIG. 1, the output of the logarithmic amplifier, as shown in FIG. 2b, is applied to the pulse shape detector circuit at terminal 10. The pulse signal at terminal 10 is simultaneously applied through conductor 11 to the delay line 12 and threshold comparator 13. The input pulse to threshold comparator 13 is compared to the threshold reference voltage which is applied via conductor 14 to the threshold comparator 13. If the output pulse on conductor 11 does not exceed the threshold reference voltage on conductor 14, the input pulse is not processed by the pulse shape detector circuit. If the input pulse on conductor 11 exceeds the threshold reference voltage on conductor 14, the threshold comparator generates a voltage which is applied via conductor 15 to monostable multivibrator 16. The threshold reference voltage applied to the threshold comparator 13 is adjusted to a predetermined level that is selected to keep the false alarm rate below a desired level.

The output of monostable multivibrator 16, as shown in FIG. 2f, is applied via conductors 17, 18, 19 and 20 to peak sample and hold circuit 28 (hereinafter referred to as PSH28), PSH26, PSH27, AND 45, AND 46 and AND 47. The output of monostable multivibrator 16 is used to reset the PSH circuits and the AND circuits to process the incoming pulse.

The time delay of delay line 12 prevents the input pulse from being processed until the output of monostable multivibrator 16 resets the PSH and the AND circuits. The block showing showing delay line 12 may contain an amplifier to compensate for the attenuation of practical delay lines. The delayed pulse output of delay line 12 is applied; via conductor 21 to delay line 22; via conductor 23 to capacitor C2; via conductor 24 to capacitor C1; and via conductor 25 to capacitor C3, simultaneously. The output of capacitor C1 is applied to a voltage divider network consisting of resistors R11 and R21. The voltage V1 which is applied to voltage divider R11–R21 is adjusted to clamp the applied pulse at a level which corresponds to the 90 percent level of the input pulse to the logarithmic amplifier. The voltage which is applied to voltage divider network R13–R23 is adjusted to clamp the input pulse at a level that corresponds to the 10 percent level of the input pulse to the logarithmic amplifier.

The output pulse from delay line 22 is applied to comparator 34 via conductor 35. The output of delay line 22 is also applied simultaneously to comparator 33 and comparator 32. The time delay of delay line 22 is greater than the longest rise time and less than a time equal to the minimum pulse width of the expected input pulses. Amplification may be needed at the output of delay line 22 to compensate for the attenuation of delay line 22. The voltage divider network R12–R22 is adjusted to clamp the input pulse to PSH 26 at the 50 percent level of the input pulse to the logarithmic amplifier. The voltage divider network R11–R21 is adjusted to clamp the input pulse to PSH 27 at the 90 percent level of the input pulse to the logarithmic amplifier. When the applied pulse to comparator 32, comparator 33, and comparator 34 exceed the output voltages of PSH26, PSH27 and PSH28 respectively, a positive voltage will be generated at the output of each comparator. The output of comparator 32 is applied via conductor 38 to flip-flop 39 (FF39). The positive output voltage of comparator 32 will cause FF39 to change state and generate a positive step voltage. The output of comparator 33 is applied via conductor 40 to FF41. The output of comparator 34 is applied via conductor 36 to FF37. When the applied waveform at the input to each comparator drops below the respective reference voltage, the output of the respective comparator will return to zero causing the respective flip-flop to change states and generate a negative step voltage. The output of FF37 will be a rectangular pulse of fixed amplitude E with a pulse width equal to the 10 percent amplitude pulse width of the input pulse to the logarithmic amplifier. The output of FF39 will be a rectangular pulse of fixed amplitude E with a pulse width equal to the 50 percent amplitude pulse width of the input pulse to the logarithmic amplifier. The output of FF41 will be a rectangular pulse of fixed amplitude E with a pulse width equal to the 90 percent amplitude pulse width of the input pulse to logarithmic amplifier.

The output of FF37 is applied to AND 45 via conductor 42. The output of FF39 is applied via conductor 43 to AND 46 while the output of FF41 is applied via conductor 44 to AND 47. The output voltage of the monostable multivibrator 16 is also applied via conductor 17 to AND 45, AND 46, AND 47.

If the threshold was exceeded by the input signal to threshold comparator 13, the output voltage of multivibrator 16 enables the AND circuits. The output of AND 45, AND 46 and AND 47 are shown in FIGS. 2c, 2d, 2e, respectively. The output of AND 47 is applied via conductor 51 to buffer amplifier 54; output of AND 46 is applied via conductor 50 to buffer amplifier 53; the output of AND 45 is applied via conductor 48 to buffer amplifier 52 and via conductor 49 to monostable multivibrator 16. The negative step of the output waveform of AND 45 is used to drive the monostable multivibrator 16 back to the stable state (zero voltage applied to conductor 17) and reset the pulse shape detector circuit for the next input pulse.

The monostable multivibrator is designed to remain in the unstable state (positive voltage applied to conductor 17) for a period of time that is much greater than the delay times of delay line 12 and delay line 22 plus a time equal to twice the pulse width of the widest pulse expected. The output of AND 45 is applied to monostable multivibrator 16 so the positive step voltage does not affect the unstable stage since this stage is conducting. The negative step voltage of the output of AND 45 drives the unstable stage of the monostable multivibrator 16 to cut-off prematurely, forcing the multivibrator to change to the stable state, (zero voltage on conductor 17).

The buffer amplifiers 52, 53 and 54 are used to isolate the AND circuits. The output of buffer amplifier 53 is a rectangular pulse whose width is equal to the 50 percent amplitude pulse width of pulse applied to the logarithmic amplifier. The output waveform is simultaneously applied to resistor R57 and via conductor 58 to a pulse width counter. The pulse width counter is optional and will provide a measure of the half-amplitude pulse width of the signal applied to the logarithmic amplifier. The output of buffer amplifier 52 is applied simultaneously to conductor 67 and resistor divider R53–R54. The output of buffer amplifier 54 is applied simultaneously to resistor R62 and conductor 68.

Both the signal on conductor 67, which is a rectangular pulse whose width is equal to the 10 percent amplitude pulse width of the input pulse to the logarithmic amplifier, and the signal on conductor 68, which is a rectangular pulse with a pulse width equal to the 90 percent pulse width of the pulse applied to the logarithmic amplifier are applied to rise time detector 69. The rise time detector 69, which may be either a flip-flop or some other suitable circuit, provides a positive step voltage on conductor 70 when the positive step voltage on conductor 67 appears. This is the leading edge of the 10 percent pulse width signal. The positive step voltage on conductor 68, which is the leading edge of the 90 percent pulse width signal causes a negative step voltage to appear on conductor 70.

The signal pulse on conductor 70 has a pulse width which is equal to the time difference in arrival of the leading edge between the 10 percent pulsewidth signal. Thus, the output pulse width of the signal is equal to the rise time of the input pulse to the logarithmic amplifier. The trailing edge of the 90 percent pulse on conductor 68 causes the rise time detector 69 to generate a positive step voltage on conductor 70. The trailing edge of the 10 percent pulse on conductor 67 cause rise time detector 69 to turn off and the output signal on conductor 70 returns to zero. Thus, the trailing edges of the pulses on conductor 68 and conductor 67 cause rise time detector 69 to generate a rectangular pulse with a pulse width equal to the fall time of the input pulse of the logarithmic amplifier. The output waveforms of rise time detector are shown in FIG. 2h.

The output of the buffer amplifiers (BA52, BA53, BA54) consist of fixed amplitude (E) rectangular pulses. To synthesize the input pulse to the logarithmic amplifier, the output amplitudes of buffer amplifiers must be adjusted so the sum of the BA outputs is proportional to 90 percent of the peak value of the input pulse to the logarithmic amplifier. Let $E(0.1)$ = adjusted amplitude of rectangular pulse whose width is equal to 10 percent amplitude width of the input pulse to the logarithmic amplifier. $E(0.5)$ = adjusted amplitude of the rectangular pulse whose width is equal to the 50 percent amplitude width of the input pulse to the logarithmic amplifier. $E(0.9)$ = adjusted amplitude of the rectangular pulse whose width is equal to the 90 percent amplitude width of the input pulse to the logarithmic amplifier.

The adjusted amplitude of the synthesized pulse is given by the following relation:

$E(0.1) + E(0.5) + E(0.9) = \mathbf{0.9\ E_p}$ where $E_p$ = voltage proportional to the peak voltage of the input pulse to the logarithmic amplifier The following relation also holds.

$E(0.1) + E(0.5) = \mathbf{0.5\ E_p}$ thus $E(0.9) = \mathbf{0.4\ E_p}$ and $E(0.1a) = 0.1\ E_p$
$E(0.5) = 0.4\ E_p$
$E(0.5) = E(0.9)$
$E(0.1) = 0.25\ E(0.5)$ The amplitude $E(0.5)$ and $E(0.9)$ can be set equal to the fixed amplitude E which is fixed by the circuit design and components used for the buffer amplifiers, AND circuits and the flip-flop circuits. The resistor divider R53 14 R54 is selected so that resistor R53 is 3 times as large as resistor 54. The amplitude of the rectangular pulse appearing across resistor R54 is one-fourth as large as the output pulse amplitude of buffer amplifier 52. The pulse singal across resistor R54 as shown in FIG. 2g, is applied to the input of sum amplifier 58 via resistor R56. The output pulse of buffer amplifier 53 is applied to sum amplifier 58 via resistor R57. The output of sum amplifier 58 is the arithmetic sum of the inputs to resistor R56 and resistor 57. The output of sum aplifier 58 is applied via conductor 60 to resistor R61. The output of buffer amplifier 54 is applied to resistor R62. The output of both resistor R62 and resistor R61 are applied to sum amplifier 63. The output of sum amplifier 63 is the synthesized pulse wave form of the input pulse to the logarithmic amplifier and is shown in FIG. 2i. The amplitude of the synthesized waveform is proportional to the amplitude of the input pulse to the logarithmic amplifier. All the components required for this invention are readily commercially available as off-the-shelf items.

Although the invention has been described with reference to a particular embodiment, it will be understood to those skilled in the art that the invention is capable of a variety of alternative embodiments within the spirit and scope of the appended claims.

What is claimed is:

1. A pulse shape detector apparatus for synthesizing the input pulse to a logarithmic amplifier comprising in combination:

a control means to receive the output pulse from said logarithmic amplifier, said control means comparing said output pulse to a predetermined threshold level, said control means generating a control signal when said output pulse exceeds said predetermined threshold level, a sample and compare means receiving said output pulse, said sample and compare means having a first, second and third sampling rate, said first sampling rate providing a first pulse having a first predetermined level, said second sampling rate providing a second pulse having a second predetermined level, said third sampling rate providing a third pulse having a third predetermined level, said control means providing said control signal to said sample and compare means to reset said sample and compare means to process said output pulse, a logic control means connected to said sample and compare means to receive said first, second and third pulses therfrom, said logic control means receiving said control signal from said control means, and a summing network connected to said logic control means to receive said first, second, and third pulses, said logic control means being reset by said control signal to apply said first, second and third pulses to said summing network, said summing network summing said first, second and third pulses to provide a synthesized output pulse, said synthesized output pulse representing the synthesized pulse waveform of said input pulse to said logarithmic amplifier, said second pulse representing the pulse width of said input pulse to said logarithmic amplifier.

2. A pulse shape detector apparatus as described in claim 1 wherein said control means comprises in combination:

a threshold comparator to receive said output pulse from said logarithmic amplifier, said threshold comparator receiving a threshold reference voltage, said threshold comparator comparing said output pulse to said threshold reference voltage, said threshold comparator generating a voltage signal when said output pulse exceed said threshold reference voltage, and monostable multivibrator connected to said threshold comparator to receive said voltage signal, said monostable multivibrator generating said control signal in response to said voltage signal, said control signal resetting said sample and compare means and said logic control means.

3. A pulse shape detector apparatus as described in claim 1 wherein said logic control means comprises in combination:
   a plurality of And gates to receive said first, second adn third pulses respectively, said plurality of And gates receiving said control signal from said control means, said plurality of And gates being reset by said control signal, said plurality of And gates performing the logical And function respectively upon receipt of said first, second and third pulses, and
   a plurality of buffer amplifiers respectively connected to said plurality of And gates to receive said first, second and third pulses respectively, said plurality of buffer amplifiers applying said first, second and third pulses to said summing network.

4. A pulse shape detector apparatus as described in claim 1 wherein said summing network comprises in combination:
   a first summing amplifier to receive said first pulse from said sample and compare means, and
   a second summing amplifier to receive said second and third pulses from said sample and compare means, said second summing amplifier summing said second and third pulses to provide a summed output, said summed output being applied to said first summing amplifier, said first pulse and said summed output being summed in said first summing amplifier to provide said synthesized output pulse.

5. A pulse shape detector apparatus as described in claim 1 further including a rise time detector connected to said logic control means to receive said first and third pulses from said sample and compare means, said rise time detector processing said first and third pulses to provide a rise time output signal, said rise time output signal being proportional to the rise time of said pulse to said logarithmic amplifier.

6. A pulse shape detector apparatus as described in claim 1 wherein said first predetermined level represents 90 percent of the level of said input pulse to said logarithmic amplifier.

7. A pulse shape detector apparatus as described in claim 1 wherein said second predetermined level represents 50 percent of the level of said input pulse to said logarithmic amplifier.

8. A pulse shape detector apparatus as described in claim 1 wherein said third predetermined level represents 10 percent of the level of said input pulse to said logarithmic amplifier.

* * * * *